United States Patent [19]

Viramontes

[11] 4,232,745
[45] Nov. 11, 1980

[54] HARVESTER WITH MECHANICAL ROD WEEDER AND SOIL AGITATOR

[76] Inventor: Jose A. B. Viramontes, Star Rte. Box 18-A, Mesilla Park, N. Mex. 88047

[21] Appl. No.: 41,882

[22] Filed: May 22, 1979

[51] Int. Cl.³ .................... A01B 39/19; A01D 15/04
[52] U.S. Cl. .................................. 172/44; 171/134; 172/54
[58] Field of Search ............... 172/44, 123, 50, 54; 171/134

[56] References Cited

U.S. PATENT DOCUMENTS

| | | | |
|---|---|---|---|
| 1,224,874 | 5/1917 | Wolfe | 172/44 X |
| 1,262,286 | 4/1918 | Thomas | 172/44 |
| 1,338,204 | 4/1920 | Wolfe | 172/44 |
| 2,954,085 | 9/1960 | Roberts | 172/44 |
| 3,104,642 | 10/1963 | Hunter | 172/44 |
| 3,146,740 | 9/1964 | Phillips | 172/44 X |
| 3,283,830 | 11/1966 | Hamby | 172/44 |
| 3,340,934 | 9/1967 | Wycoff | 172/44 X |
| 3,430,702 | 3/1969 | Hamby et al. | 172/44 |
| 3,735,816 | 5/1973 | Koehn | 172/44 |
| 4,159,745 | 7/1979 | Hood et al. | 172/44 |

Primary Examiner—Paul E. Shapiro
Attorney, Agent, or Firm—Clarence A. O'Brien; Harvey B. Jacobson

[57] ABSTRACT

A double, transverse, parallel tool bar is attached to the three-point hitch of a tractor. A depending shank is welded to each tool bar extension for mounting the rod weeder. Each shank has a forwardly and downwardly extending hard faced chisel tooth and a rearwardly extending skid which controls depth of penetration of the rod weeder. A chain and sprocket drive assembly is connected to the center shank and driven through the PTO of the tractor. The other shanks each have contained therein a bearing having a spare aperture through which a square rod weeder bar is disposed. The outermost shanks each have a strap which is bolted over the ends of the rod weeder bars to hold them in place and provide for easy replacement thereof. A plurality of cleaner bars are disposed 1/16th of an inch behind the high cam position of the rod weeder and fixedly connected between the shanks for both cleaning the rod and providing lateral support for the shanks. An additional bar is mounted in an offset position behind each shank. The bar contains a plurality of tines which are driven in unison in an up and down motion for separating fruit which has been uprooted by use of the rod weeder from the surrounding soil to facilitate the manual harvesting of the fruit.

16 Claims, 9 Drawing Figures

HARVESTER WITH MECHANICAL ROD WEEDER AND SOIL AGITATOR

BACKGROUND OF THE INVENTION

1. Field of the Invention

This invention relates to harvesters utilized for removing onions and other types or crops which must be uprooted from the soil prior to harvesting.

2. Discussion of Related Art

Several rod weeder mechanisms have been suggested in the past. U.S. Pat. No. 2,355,229, issued Aug. 8, 1944, to Miller, shows the basic concept of the use of a rod weeder for harvesting crops which form below the soil surface. U.S. Pat. No. 2,954,085, issued Sept. 27, 1960, to Roberts, shows a bean vine cutter which uses the rod weeder concept. The Roberts device includes a cleaner bar disposed immediately behind the rotating rod for clearing away cut weeds. The cleaner bar of Roberts is disposed at an angle to the horizontal and Roberts does not discuss the criticality of spacing between the cleaner bar and the rotating rod. U.S. Pat. No. 3,283,830, issued Nov. 8, 1966, to Hamby, shows a rod weeder which uses a plurality of vertically disposed shanks with each shank being slidably attached to a tool bar assembly composed of two parallel, transverse square bars. The rotating rod of Hamby is attached to a plurality of shanks through the use of flangettes which are bolted to the shanks thereby requiring a great deal of effort in replacing the bearings. U.S. Pat. No. 3,340,934, issued Sept. 12, 1967, to Wycoff, shows an agricultural implement which includes a soil agitator mechanism used for loosening soil. The soil agitator operates from a rotating offset pin through an oscillating bell crank which alternatingly raises and lowers a plurality of tines. The alternating operation of the tines of Wycoff would hinder its use in harvesting crops as the pressure created by the one tine alone would tend to damage crops when attempting to loosen them from the soil.

SUMMARY OF THE INVENTION

The present invention includes a tool bar comprising a pair of transverse, parallel, square bars which are connected to the three-point hitch of a tractor for raising and lowering the entire harvester. The transverse rods are interconnected by a plurality of tool bar extensions to which are welded depending shanks. The tool bar extensions are movable longitudinally along the tool bar for allowing the harvester to be adjusted to accommodate crop rows having various widths. On the front of each shank is attached a curved, downwardly extending chisel tooth for breaking the soil between crop rows. At the rear of each shank is an elongated skid for determining the depth of penetration of the harvester. The center shank has a gear box assembly which is attached to the power takeoff of the tractor. The drive assembly includes two drive sleeves for receiving one end of two oppositely extending square rods. The square rods extend through bearings included in each of the other shanks. Each rod is held in place by a strap which is attached to the outermost shank and bears against the end of the rod holding it in place in the drive sleeve. The straps may be easily removed for changing rods, and the bearings in the shanks can be easily replaced by simply twisting the bearings by 90° and sliding them from grooves in the shanks. Connected between each pair of adjacent shanks and spaced not more than 1/16" behind the rotating rod is a wiper bar. Each wiper bar can be welded or bolted to two of the shanks and provides lateral support for the shanks as well as effecting cleaning of the rotating rod. An agitator is also connected through the shanks and driven by the drive assembly. The agitator contains a plurality of rearwardly extending tines which are moved in a vertical oscillatory motion in unison for removing dirt from the produce which has been uprooted by the rotating rod weeder.

Accordingly, one object of the present invention is to provide a unique harvester with mechanical rod weeder and soil agitator which is produced with a minimum number of components, yet is rugged and reliable in use.

A further object of the present invention is to provide a harvester with mechanical rod weeder and soil agitator wherein the individual components of the harvester can be easily replaced in a minimum amount of time by using a minimum number of bolts for assembly of the harvester.

A still further object of the present invention is to provide a harvester with mechanical rod weeder and soil agitator incorporating a cleaner bar which not only provides cleaning for the rotating rod, but also adds to the lateral rigidity of the harvester.

An additional further object of the present invention is to provide a harvester with mechanical rod weeder and soil agitator which incorporates the use of a plurality of skids for defining the depth of penetration of the harvester, rather than using conventional wheels which are expensive and can cause severe problems.

One still further additional object of the present invention is to provide a harvester with mechanical rod weeder and soil agitator which can not only uproot a crop being harvested, but is also capable of agitating soil loose from the crop for reducing the amount of manual labor necessary in the harvesting process.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
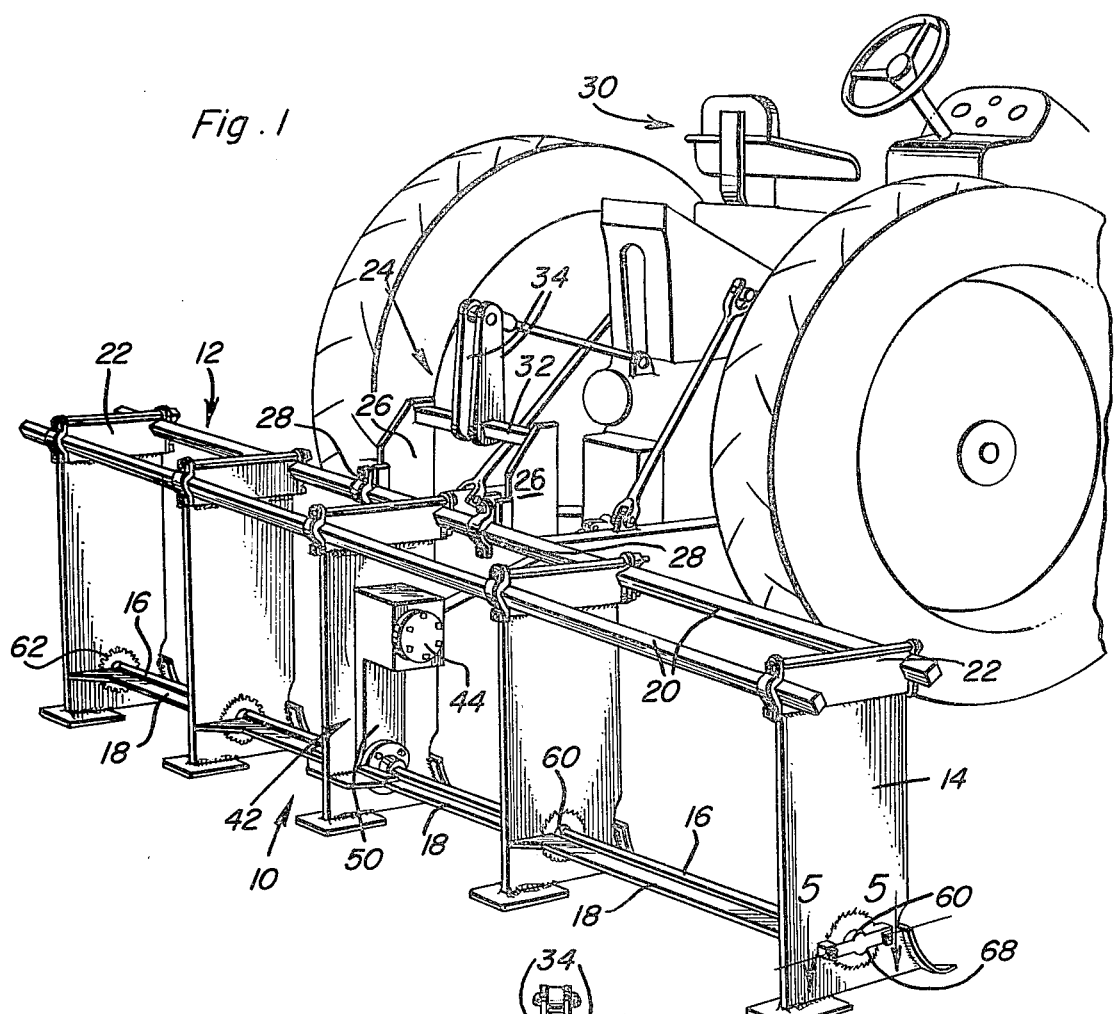
FIG. 1 is a perspective view of the harvester with mechanical rod weeder as attached to the three-point hitch of a farm tractor.
Figure 2:
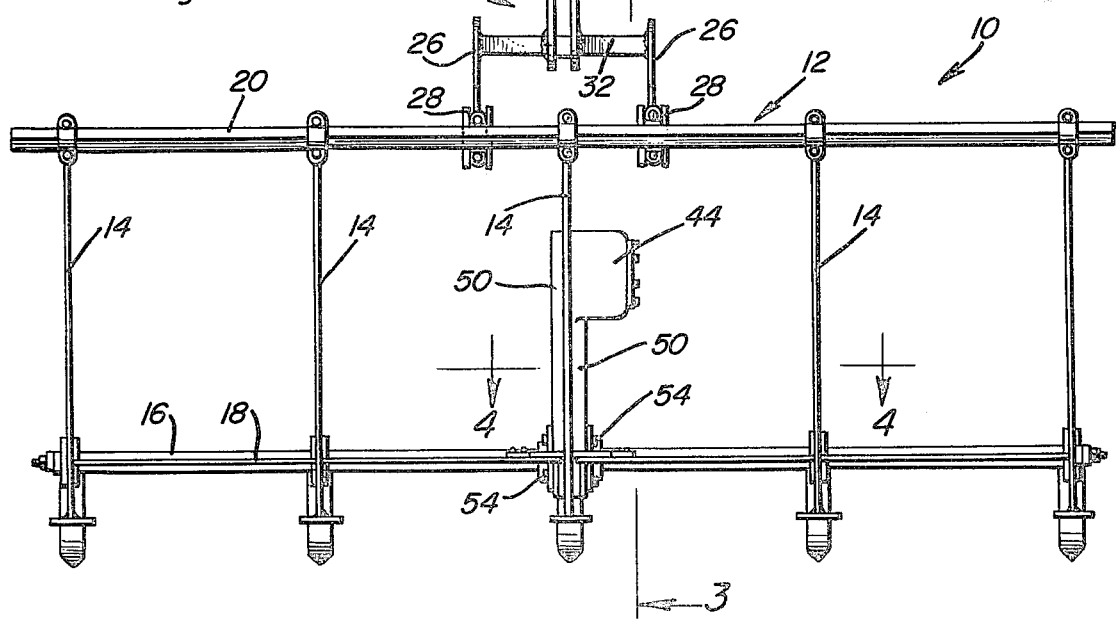
FIG. 2 is a top plan view of the harvester with mechanical rod weeder of the present invention.
Figure 3:
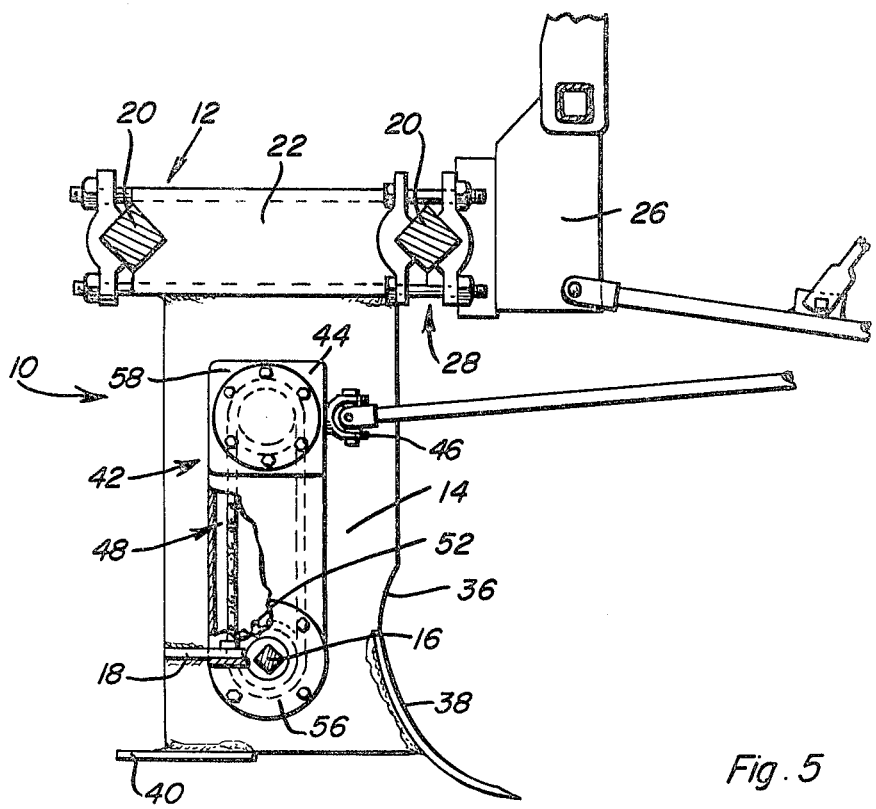
FIG. 3 is a side sectional elevational view taken substantially along a plane passing through section line 3—3 of FIG. 2 showing the gear and chain drive assembly of the present invention.

Now with reference to the drawings, a harvester with mechanical rod weeder incorporating the elements of the present invention and generally designated by the reference numeral 10 will be described in detail. With specific reference to FIGS. 1 through 4, it will be seen that the harvester 10 includes a tool bar assembly 12 which is attached to a plurality of shanks 14 which in turn mount the rotating weeder rods 16 and the cleaner bars 18.

The tool bar assembly 12 itself comprises a pair of transverse parallel square bars 20 which are interconnected by a plurality of tool bar extensions 22 of conventional construction. It should be noted that the tool bar extensions 22 are movable longitudinally along the bars 20 for providing desired lateral spacing between the individual extensions. Also mounted to the parallel transverse bars 20 is the mounting structure 24 which comprises a pair of spaced vertical plates 26 which are connected to one of the bars 20 by clamps 28. Each plate 26 is hingedly connected to one of the lower struts of the three-point hitch of tractor 30. A frame member 32 interconnects the two plates 26 and mounts a pair of spaced plates 34 which are hingedly connected to the third member of the three-point hitch of tractor 30.

Welded to the lower portion of each tool bar extension 22 is one shank 14. Accordingly, it can be seen that by repositioning the extensions 22, the spacing between the shanks 14 will be adjusted. Each shank is substantially planar in configuration and preferably formed from ¾" plate steel 14" in width. With such dimensions, flexing of the shanks in the direction of travel of the harvester is severely limited. In order to insure that no flexing will occur, the parallel transverse bars 20 should be chosen to provide adequate stability. The contemplated invention utilizes 2¼" by 2¼" square bars thereby eliminating any such undesirable flexing. In the lower forward portion of each shank, an incurved surface 36 is formed. Welded into the surface 36 is a half chisel point 38 which extends downwardly and curves forwardly of the shank. The half chisel points are hard surfaced with any known metal alloy over, around and under all cutting edges. Welded to the bottom of each shank 14 and rearwardly thereof is a skid 40. Skids 40 are preferably formed from hardened plate steel and are approximately ⅜" by 2" by 6". Each skid is attached to the bottom surface of its respective shank and extends rearwardly thereof. The skids effectively control depth and pitch of the shanks while they are in the operational mode. Furthermore, the skids are situated in such a manner as to not interfere with the crop harvesting process.

The centermost shank 14 of the harvester is postioned directly behind tractor 30 and is specially adapted to contain the rod drive 42. Rod drive 42 includes a gear box 44 which is driven through universal joint 46 by the power take off of tractor 30. Gear box 44 drives the chain and sprocket assembly 48 which is located centrally of the shank and covered on each side by housing halves 50. Lower sprocket 52 of the chain and sprocket drive 48 is connected to a pair of drive sleeves 54 which can most clearly be seen with reference to FIGS. 2 through 4. Drive sleeves 54 are supported and journaled in apertures in housing halves 50. These apertures are covered by flangettes 56 which bolt to the respective housing halves to allow access to the interior of the housing for changing bad bearings or replacing the chain of the chain and sprocket drive 48. Likewise, a cover 58 is bolted over the gear box 44 for allowing access to the interior thereof.

It will be noted that a square aperture is formed in each of the drive sleeves 54 for slidably receiving one end of each weeder bar 16 and operatively engaging the bars with the power take off of the tractor. Bars 16 are caused to rotate in a direction opposite to the direction of travel of the harvester thereby uprooting any crop with which contact is made. The bars 16 extend longitudinally of the parallel bars 20 through each of the shanks 14. Each shank 14 has a bearing 60 slidably received therein, as shown most clearly in FIGS. 5 and 6. Bearings 60 are aligned for receiving rods 16. In order to perfectly align the bearings and to avoid the use of bolts for holding the bearings in place, a plurality of disks 62 are first machined to snugly receive the bearings. The bearings are then properly aligned and the disks are welded in place on the respective shanks 14. As can easily be seen in FIG. 5, the machined opening is circular in circumference and axially concave to receive bearing 60 which is also circular in circumference but axially convex. In this manner, the cooperating concave and convex surfaces hold the bearing in place when weeder rod 16 is inserted in the bearing. To facilitate insertion and removal of bearing 60, a pair of aligned slots 67 are formed in disk 62. The slots have a width sufficient to receive the bearing. Once the bearing is inserted, it can be twisted by 90° to engage the concave and convex surfaces. In like manner, to remove a bearing 60, rod 16 should be removed and the bearing should be twisted by 90° as indicated by arrow 64 in FIG. 5. At this time, the bearing can easily be slid through slots 67. Also, due to the tight frictional fit between the outer bearing periphery and the machined opening, the outer race of the bearing will not rotate with the rod as it rotates. Inasmuch as all bearings are inserted in this manner, it can easily be seen that the bearings can be quickly and easily removed for replacing malfunctioning or defective bearings, thereby reducing down time of the machine.

Figure 5:
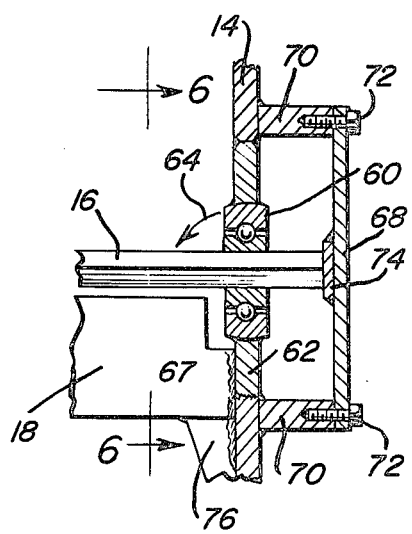
FIG. 5 is a top plan sectional view taken substantially along a plane passing through section line 5—5 of FIG. 1 showing the keeper strap of the present invention.
Figure 6:
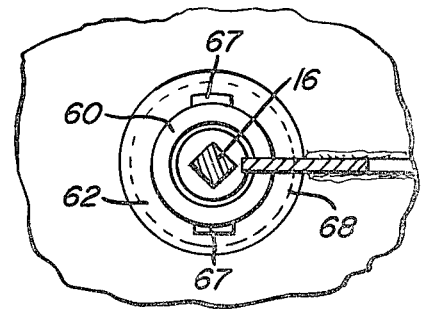
FIG. 6 is a elevational sectional view taken substantially along a plane passing through section line 6—6 of FIG. 5.

Furthermore, as seen in FIGS. 5 and 6, it can be seen that the ends of rod 16 opposite to those received in sleeves 54 extend outward past the end of the last shank 14. An inward force is applied to maintain the rod 16 in contact with the sleeves by use of retainer straps 68. Each retainer strap 68 is mounted on a pair of bosses 70 which extend laterally away from the outermost shanks 14. A pair of bolts 72 extend through the retainer straps 68 and threadedly engage the respective bosses 70 for holding the retainer strap in place. Welded to the inner surface of retainer strap 68 is a hardened abutment plate 74 which actually contacts the free end of rod 16 to apply a slight amount of inward force thereon. When it is desired to remove rod 16 for replacement due to some defect in the rod, all that need be done is to loosen one of the bolts 72, remove the other of the bolts 72, let the retainer strap 68 dangle from the loosened bolt and simply apply an outward force on the rod 16. It will easily slide from its mountings.

Figure 4:
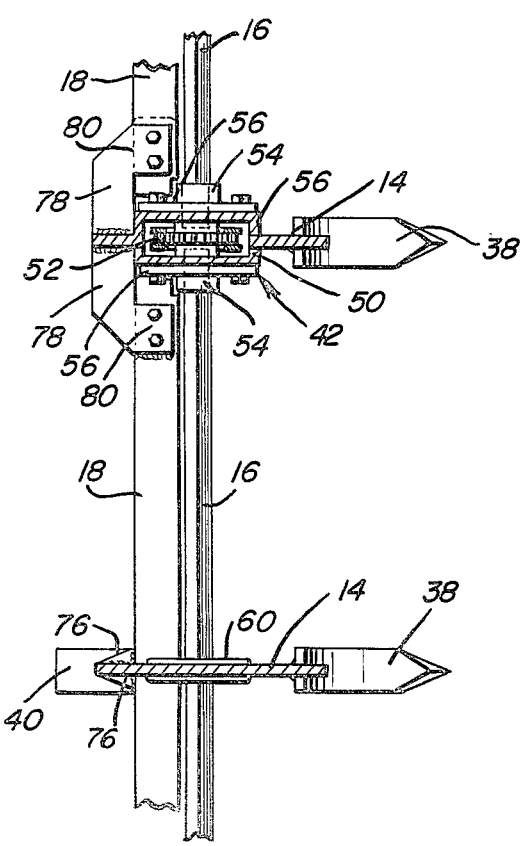
FIG. 4 is an elevational sectional view taken substantially along a plane passing through section line 4—4 of FIG. 3 showing the chisel teeth of the present invention.

Now again with reference to FIGS. 1 and 4, it can be seen that cleaner bars 18 are mounted to the rear of rod 16. Each cleaner bar is a substantially flat member having its major surfaces parallel to the ground. The cleaner bar is ½"×2" and extends between any two of the shanks 14. It is welded to the shanks in a position not more than 1/16" behind the 1"×1" square weeder rod 16. Gussets 76 may be welded to the cleaner bars as shown, if additional strength is needed. When welding the cleaner bars to the shanks, it should be noted that sufficient room must be maintained for allowing the removal of bearings 60. As shown in FIG. 4, the cleaner bars 18 which extend to housing halves 50 are supported at their inner ends by angled support members 78 which are welded to the shank. This is necessary since additional room must be left for the removal of flangettes 56. Inserts 80 are bolted on the angled supports to fill in the open area between the ends of the cleaner bars and the housing. The inserts can easily be removed to provide sufficient room for removal of flangettes 56. The cleaner bars serve two purposes. First, by virtue of their spacing 1/16" or less behind the high point of rod 16, the cleaner bars act to inhibit the wrapping of weeds or roots or the accumulation of dirt on or around the rotating rod 16. In addition, by virtue of their connection between adjacent shanks, the cleaner bars provide needed lateral support to the shanks, thereby insuring a rigid construction for the harvester. It should also be noted that cleaner bars 18 can be bolted to the shanks 14. However, welding is preferred as it leaves no bolt heads to catch and accumulate debris.

Figure 7:
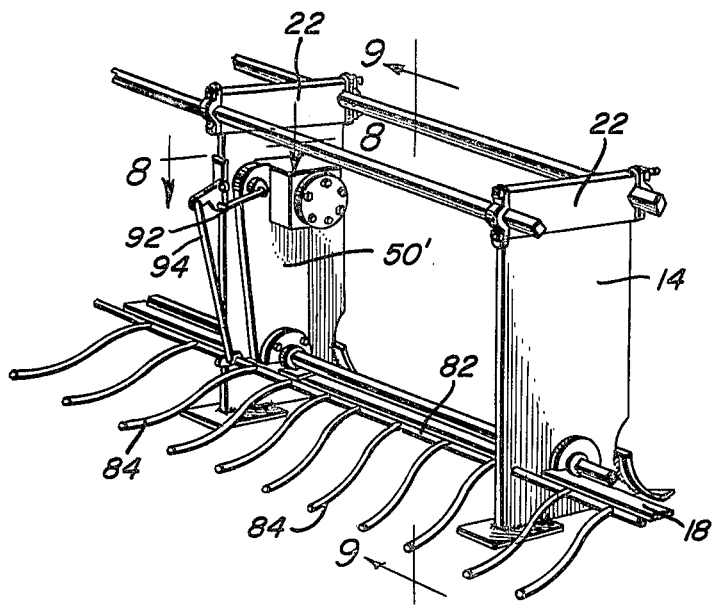
FIG. 7 is a fragmental perspective view of the harvester with mechanical rod weeder and soil agitator.
Figure 8:
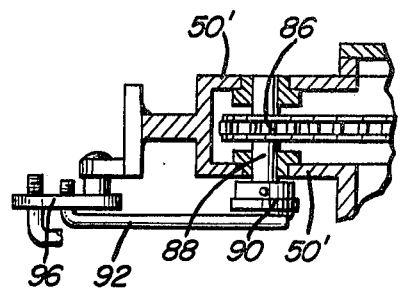
FIG. 8 is a sectional plan view taken substantially along a plane passing through section line 8—8 of FIG. 7.
Figure 9:
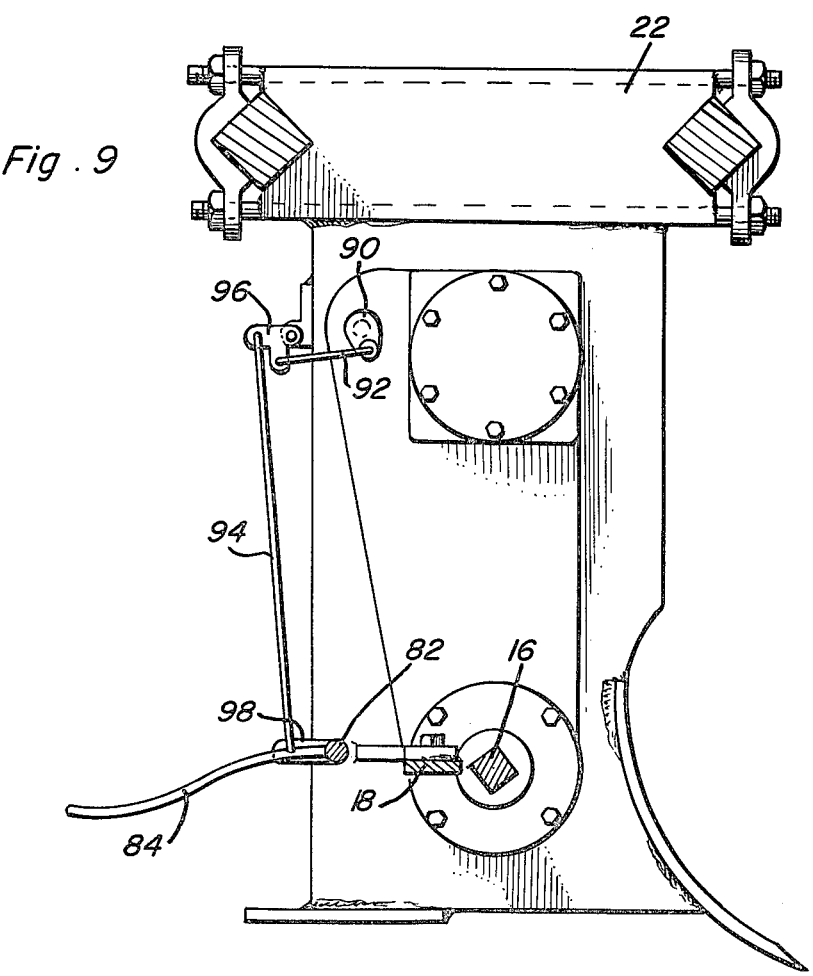
FIG. 9 is an elevational sectional view taken substantially along a plane passing through section line 9—9 of FIG. 7.

Now with reference to FIGS. 6 through 8, the soil agitator attachment for the harvester will be described in detail. The soil agitator includes agitator bar 82 which extends for the entire longitudinally dimension of the harvester and is supported and journaled in each of the shanks 14. The agitator bar has a plurality of tines 84 which extend rearwardly therefrom. Each tine 84 is caused to oscillate in a vertical plane thereby separating any vegetation which has been uprooted by rod 16 from the surrounding soil in order to facilitate the manual harvesting thereof. The oscillation of bar 82 and tine 84 is produced through gear 86 which is included in the aforementioned chain and sprocket drive 48 and housing in expanded housing halves 50' as seen in FIG. 8. Gear 86 is mounted on shaft 88 which also mounts offset drive element 90 which drives connecting rod 92. Connecting rod 92 transfers motion to connecting rod 94 through bell crank 96. Connecting rod 94 in turn is mounted on offset mount 98 which is attached to agitator bar 82. Accordingly, whenever the power take off of tractor 30 is set in motion, tines 84 will be caused to oscillate vertically thereby loosening dirt from the produce being harvested. By making connecting rods 92 and 94 adjustable in length by any known method, both the throw and depth of penetration of tines 84 can be easily adjusted to accommodate varying soil conditions and various types of produce to be harvested. It should be noted that the most effective position for mounting agitator bar 82 is directly behind the cleaner bar 18. In this manner, the agitator bar 82 will be assured of moving under the uprooted vegetation left by rotating rod 16, yet will not contact undisturbed soil as would be the case if the agitator bar were positioned below rod 16. If bar 82 were positioned above rod 16, it might contact and damage vegetation which otherwise would be harvestable. Furthermore, it will be noted that the tines 84 have an upwardly curved configuration. This is to insure the removal of dirt and other debris from the harvestable produce. As produce is uprooted by the rotating weeder rod and as it travels across the cleaner bar, a certain degree of vibration is imposed upon the produce and soil particles in the immediate vicinity. The produce continues to travel rearwardly and comes in contact with the soil agitator. When the produce contacts the agitator, the curved tines catch it and the produce is retained on top of the tines for a few seconds allowing the soil particles or other debris to shake loose from the produce. As the produce is held by the upwardly curved tines, additional produce travels across the cleaner bar and causes an instantaneous mass collection of the articles of produce with the soil and other debris falling free and separated therefrom. In this regard, it should also be noted that the tines are formed from round rods to further facilitate the dropping off of dirt and debris. Also, the spacing between the tines 84 is critical as this spacing should be close enough to accommodate the specific produce being harvested but not so close as to inhibit the separation of dirt therefrom.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a crop harvesting implement for attachment to the three-point hitch of a tractor and the tractor power take off, the combination comprising:
   a transverse elongated frame;
   a plurality of rigid shanks dependingly attached to said frame and spaced longitudinally thereof, with one of said shanks being positioned immediately behind the rear of said tractor and other of said shanks being laterally spaced thereof;
   a power drive mechanism attached to said one of said shanks, said power drive having means for connection to the power take off of said tractor;
   a square rod;
   an adapter means attached to said power drive mechanism, said adapter means slidably receiving said rod for transmitting rotary motion thereto;
   a bearing mounted in each of the other of said shanks, said bearings slidably receiving said square rod; and
   a retainer means attached to one of said shanks and overlying a free end of said square rod to maintain said square rod in engagement with said adapter means.

2. The apparatus of claim 1 and further wherein said frame comprises a pair of parallel elongated bars interconnected by a plurality of tool bar extensions, each of said shanks being welded to the bottom of one of said tool bar extensions.

3. The apparatus of claim 2 wherein each shank is substantially flat in shape and lies in a plane perpendicular to said tool bar.

4. The apparatus of claim 3 wherein each of said shanks has an incurved lower front portion, and a downwardly extending curved point attached to each of said incurved portions.

5. The apparatus of claim 4 and further including a skid attached to the lower rear of each shank for defining the depth of penetration and angular orientation of the shank when in the operative mode.

6. The apparatus of claim 1 wherein said bearing in each of the other of said shanks is slidably received in a machined aperture, said bearing having an axially convex surface and said machined aperture having an axially concave surface cooperatively engaging said convex surface.

7. The apparatus of claim 1 and further including a plurality of substantially planar cleaner bars, each cleaner bar extending between two of said shanks and being positioned immediately behind a portion of said square rod.

8. The apparatus of claim 7 wherein said cleaner bar is positioned no more than 1/16" behind said square rod.

9. The apparatus of claim 8 wherein each cleaner bar is substantially rectangular in shape and has one major surface which is positioned in a substantially horizontal plane.

10. The apparatus of claim 1 and further including a soil agitator means positioned directly behind said square rod.

11. The apparatus of claim 10 wherein said soil agitator means includes a longitudinally extending agitator rod attached to a plurality of rearwardly extending tines, and drive means drivingly connecting said agitator means to said power take off for causing vertical oscillatory of said tines.

12. The apparatus of claim 11 wherein each of said tines has an upwardly curved configuration for holding produce thereon during the upward portion of the oscillatory motion.

13. The apparatus of claim 12 wherein said drive means includes a first connecting rod attached to a bell crank, said bell crank having a second connecting rod extending therefrom and attached to said agitator bar, said first and second connecting rods being adjustable in length for adjusting the throw and vertical extremes of movement of said tines.

14. In a crop harvesting implement for attachment to the rear of a tractor, the combination comprising:
    a transverse elongated frame member;
    a plurality of downwardly extending shanks, each shank being adjustably mounted upon said frame member for movement along a longitudinal dimension thereof;
    a weeder bar extending through and being supported and journaled in each one of said shanks;
    weeder bar drive means attached to said weeder bar for causing rotation of said weeder bar in a direction against the forward movement of said implement;
    cleaner bar means having a plurality of sections, each section extending between two adjacent shanks, said cleaner bar means being positioned at not more than 1/16" behind said rod weeder;
    agitator means having a plurality of tines connected for vertical oscillatory motion, said agitator means being connected to said shanks directly behind said cleaner bar; and
    connector means for connecting said implement to the three-point hitch of a tractor.

15. The apparatus of claim 14 wherein said cleaner rod is slidably received in each of said shanks and strap retainers removably engaged to the outermost shanks and overlying free ends of said weeder bar for applying inward pressure on said weeder bar for holding said weeder bar in engagement with said shanks.

16. The apparatus of claim 14 wherein said tines have an upwardly curved configuration.

* * * * *